(12) United States Patent
Ananny et al.

(10) Patent No.: US 8,407,671 B2
(45) Date of Patent: Mar. 26, 2013

(54) ACCESSORY VALIDATION SYSTEM

(75) Inventors: John Ananny, Cupertino, CA (US); Jesse Dorogusker, Los Altos, CA (US)

(73) Assignee: Apple Inc., Cupertino, CA (US)

(*) Notice: Subject to any disclaimer, the term of this patent is extended or adjusted under 35 U.S.C. 154(b) by 1155 days.

(21) Appl. No.: 12/238,755

(22) Filed: Sep. 26, 2008

(65) Prior Publication Data

US 2009/0182535 A1    Jul. 16, 2009

Related U.S. Application Data

(60) Provisional application No. 61/020,719, filed on Jan. 13, 2008.

(51) Int. Cl.
G06F 9/44  (2006.01)
G06F 13/00 (2006.01)

(52) U.S. Cl. .................. 717/124; 710/104

(58) Field of Classification Search ......... 717/124–126, 717/724–725; 710/104
See application file for complete search history.

(56) References Cited

U.S. PATENT DOCUMENTS

| | | | | |
|---|---|---|---|---|
| 5,123,091 A * | 6/1992 | Newman | ......................... | 710/30 |
| 5,638,427 A * | 6/1997 | Flemming et al. | ......... | 379/93.17 |
| 5,638,724 A * | 6/1997 | Sanders | ....................... | 76/107.1 |
| 6,131,060 A * | 10/2000 | Obradovich et al. | ........... | 701/49 |
| 6,738,937 B1 * | 5/2004 | Bergsten | ....................... | 714/718 |
| 7,529,870 B1 * | 5/2009 | Schubert et al. | .............. | 710/105 |
| 7,529,871 B1 * | 5/2009 | Schubert et al. | .............. | 710/105 |
| 7,873,771 B2 * | 1/2011 | Krueger et al. | ............... | 710/303 |
| 8,076,984 B2 * | 12/2011 | Song et al. | .................... | 331/176 |
| 2004/0059971 A1 * | 3/2004 | Cowan | ......................... | 714/724 |
| 2006/0053335 A1 * | 3/2006 | Hille | ............................... | 714/4 |
| 2007/0038785 A1 * | 2/2007 | Varanda et al. | ................. | 710/62 |
| 2008/0059837 A1 * | 3/2008 | Dematteis et al. | .............. | 714/25 |
| 2008/0228600 A1 * | 9/2008 | Treyz et al. | ..................... | 705/27 |
| 2008/0270210 A1 * | 10/2008 | Kratschmer et al. | .............. | 705/7 |
| 2010/0081337 A1 * | 4/2010 | Dorogusker et al. | ......... | 439/660 |
| 2010/0256865 A1 * | 10/2010 | Ying | .............................. | 701/33 |
| 2011/0307906 A1 * | 12/2011 | Varanda et al. | ............... | 719/323 |

* cited by examiner

*Primary Examiner* — Christopher B Shin
(74) *Attorney, Agent, or Firm* — Kilpatrick Townsend & Stockton LLP

(57) ABSTRACT

Circuits, methods, and apparatus for testing media player accessories. One example includes an accessory validation system including hardware, firmware, and software. This example provides two test modes, referred to a sniff mode and an emulation mode. In the sniff mode, a test box may be inserted between an accessory and a media player. Traffic between the accessory and media player may be monitored and the presence of errors may be determined. In the emulation mode, the accessory validation system hardware emulates a media player. The emulator provides various types of responses to the accessory that would otherwise occur infrequently with an actual media player. The tests to be completed in these modes are compiled based on the category of functions that an accessory maker wishes to claim for the accessory. These category claims are then converted into a number of rules. From these rules, specific tests are generated.

40 Claims, 20 Drawing Sheets

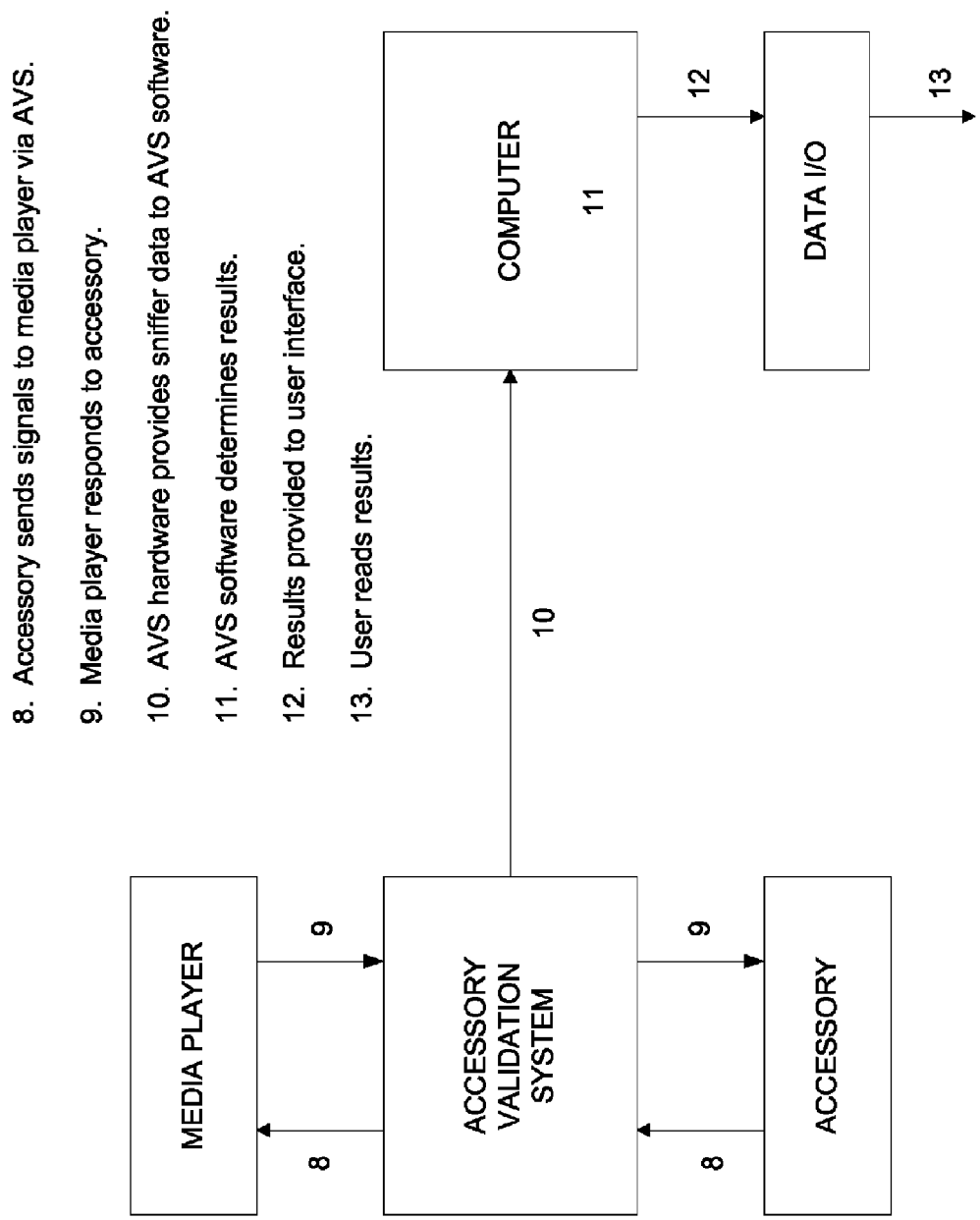

| ACCESSORY CATEGORY CAPABILITIES | MULTI PACKET LOGIC | PACKET STRUCTURE | TRANSPORT | HARDWARE (PHYSICAL LAYER) |
|---|---|---|---|---|

electrical

Accessory detect (pin 20)    Charging voltages
  rising: 0   falling: 1        FW (pins 11/12)    0.00 V
                                USB Vbus (pin 8)   0.00 V
Accessory ID (pin 10)           USB D+ (pin 4)     0.00 V
  558 KΩ                        USB D- (pin 6)     0.00 V serial transport Nominal baud rate         57600
Max baud rate error (FF)  1.9%
Max baud rate error (55)  0.4% iAP identification + authentication

Legacy Identify: ----        Accessory Info fields
IdentifyDeviceLingoes        Caps:   ----
  device ID: 0x0000          name:   ----
  lingoes:   0x0000          fw:     ----
   F E D C B A 9 8           hw:     ----
   - - - - - - - -           mfg:    ----
   7 6 5 4 3 2 1 0           model:  ----
   - - - - - - - -           serial: ----

Lingoes used:  0x000C        Authentication: ----
Lingoes ACK'd: 0x----

(Clear)    (Add record)

| Source | Timestamp | Baud (FF) | Baud (55) | Interbyte | Lingo | Command | Parsed payload contents |
|---|---|---|---|---|---|---|---|
| accessory | 21.931 s | 56550 | 57375 | < 100 us | Simple Remote Lingo | ContextButtonStatus | sending status 'Next Track' |
| accessory | 21.981 s | 56604 | 57375 | < 100 us | Simple Remote Lingo | ContextButtonStatus | sending status 'Next Track' |
| accessory | 22.032 s | 58283 | 57375 | < 100 us | Simple Remote Lingo | ContextButtonStatus | sending status 'Next Track' |
| accessory | 22.082 s | 58283 | 57375 | < 100 us | Simple Remote Lingo | ContextButtonStatus | sending status 'Next Track' |
| accessory | 22.099 s | 56496 | 57375 | < 100 us | Simple Remote Lingo | ContextButtonStatus | sending status 'All buttons up' |

FIG. 12B electrical

Accessory detect (pin 20)
   rising: 0    falling: 1

Accessory ID (pin 10)
   bin 13 (+3)    558 KΩ

Charging voltages
   FW (pins 11/12)    0.00 V
   USB Vbus (pin 8)    0.00 V
   USB D+ (pin 4)    0.00 V
   USB D- (pin 6)    0.00 V serial transport

| Nominal baud rate | 57600 |
|---|---|
| Max baud rate error (FF) | 1.9% |
| Max baud rate error (55) | 0.4% | iAP identification + authentication

Legacy Identify:  lingo 2
IdentifyDeviceLingoes
   device ID:    0xDDD
   lingoes:    0x008D

| F | E | D | C | B | A | 9 | 8 |
|---|---|---|---|---|---|---|---|
| - | - | - | - | - | - | - | - |

| 7 | 6 | 5 | 4 | 3 | 2 | 1 | 0 |
|---|---|---|---|---|---|---|---|
| X | - | - | - | X | - | - | X |

Lingoes used:    0x0089
Lingoes ACK'd:   0x0009

Accessory Info fields
   caps:    -----
   name:   -----
   fw:     -----
   hw:     -----
   mfg:    -----
   model:  -----
   serial:  -----

Authentication:  0.97 s
   RetDevAuthInfo:  v1.0

FIG. 12C

ACCESSORY VALIDATION SYSTEM

CROSS REFERENCE TO RELATED APPLICATIONS

This application claims the benefit of U.S. provisional application No. 61/020,719, filed Jan. 13, 2008, titled "Accessory Validation System," which is incorporated by reference.

BACKGROUND

Media players have become extraordinarily popular during the past several years. As a result, accessories that operate with these media players have proliferated. These accessories include speaker systems, remote controls, FM tuners and transmitters, chargers, as well as a myriad of others. The result is that currently many different accessories are made by many different manufacturers.

These manufacturers have developed test methods to ensure that their accessories are compatible with one or more of these media players. To date, testing has been typically limited to testing an accessory with a media player attached. However, some real-world events may happen only on rare occasions, too infrequently for reliable testing. Moreover, the operation of a media player may later change after a software or firmware update. This may result in a change in the operability of an accessory with a media player.

To avoid this circumstance, specifications for these accessories have been developed. An accessory manufacturer needs to meet these specifications in order to claim compliance with one or more particular media players. Unfortunately, some accessories may not meet one or more of these specifications. Such a violation may go unnoticed if during testing with a media player, the specification violation does not cause an actual error. However, at a later time, the software or firmware of the media player, or the media player itself, may be updated. The previously unnoticed specification violation may then cause an error when the accessory operates with the updated device.

This is highly undesirable for the manufacturer of the media player. If an update causes a media player to operate incorrectly with an accessory, a consumer is likely to place blame with the media player manufacturer that provided the update, rather than the accessory manufacturer that made an accessory having a specification violation.

Thus, what is needed are circuits, methods, and apparatus for testing accessories that can determine whether an accessory is violating one or more of these specifications. It is further desirable that testing include tests for occurrences that occur infrequently when using a media player.

SUMMARY

Accordingly, embodiments of the present invention provide circuits, methods, and apparatus for testing media player accessories. Compliance with a testing procedure using embodiments of the present invention may be required to gain a certification that an accessory is interoperable with one or more media players. As part of the certification, a showing that testing has been completed without errors may be required.

A specific embodiment of the present invention includes an accessory validation system. This system may include accessory validation system hardware and software. The hardware may further include accessory validation system firmware. The accessory validation system provides two test modes, referred to as a sniff mode and an emulation mode. In the sniff mode, a test box, the accessory validation system hardware, may be inserted between an accessory and a media player. During testing, traffic such as data transfers, commands, voltage levels, impedances, and other information can be sniffed, that is monitored, and provided to accessory validation system software. The accessory validation system software reads the traffic and looks for errors. These tests may be conducted for each media player for which certification is sought.

In the emulation mode, a media player may not be needed; instead, part of the accessory validation system hardware acts to emulate a media player. The emulator provides various types of responses to the accessory. For example, it may provide responses that occur infrequently with an actual media player. The emulator may also provide signals and responses having worst-case timing or other characteristics. Other such stress tests may be performed using the emulator.

The tests to be completed in these modes are compiled based on the category of functions that an accessory maker wishes to claim for the accessory. These category claims are then converted into a number of rules. For example, if the accessory is intended to operate as a remote control, it should be able to follow the rules for a number of functions, such as skip, play, pause, and the like. From these rules, specific tests are generated. In various embodiments of the present invention, additional user-defined tests may be added.

The tests to be run can test the accessory at a number of levels. A hardware level can be tested to ensure that the accessory is providing signals having the correct voltage, that correct impedances are being provided, and that certain pins that are to be forced to specific voltages are indeed forced to that voltage. The formatting of the signals themselves can also be tested. For example, whether the frequency of the signals provided by the accessory may be tested. The format of the packets of data sent from the accessory to the media player may be tested. Also, the packets sent to the media player can be checked for logical sense. These tests all are part of ensuring that the accessory performs the category function or functions that are claimed.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIGS. 3A and 3B illustrate the activities in an accessory validation system during a sniff test according to an embodiment of the present invention;

FIG. 6 illustrates the levels of testing performed by an embodiment of the present invention;

FIGS. 12A-12C are screenshots showing information provided to a user during a sniff mode test, or during an emulation mode test when sniff data is being provided;

DESCRIPTION OF EXEMPLARY EMBODIMENTS

Figure 1:
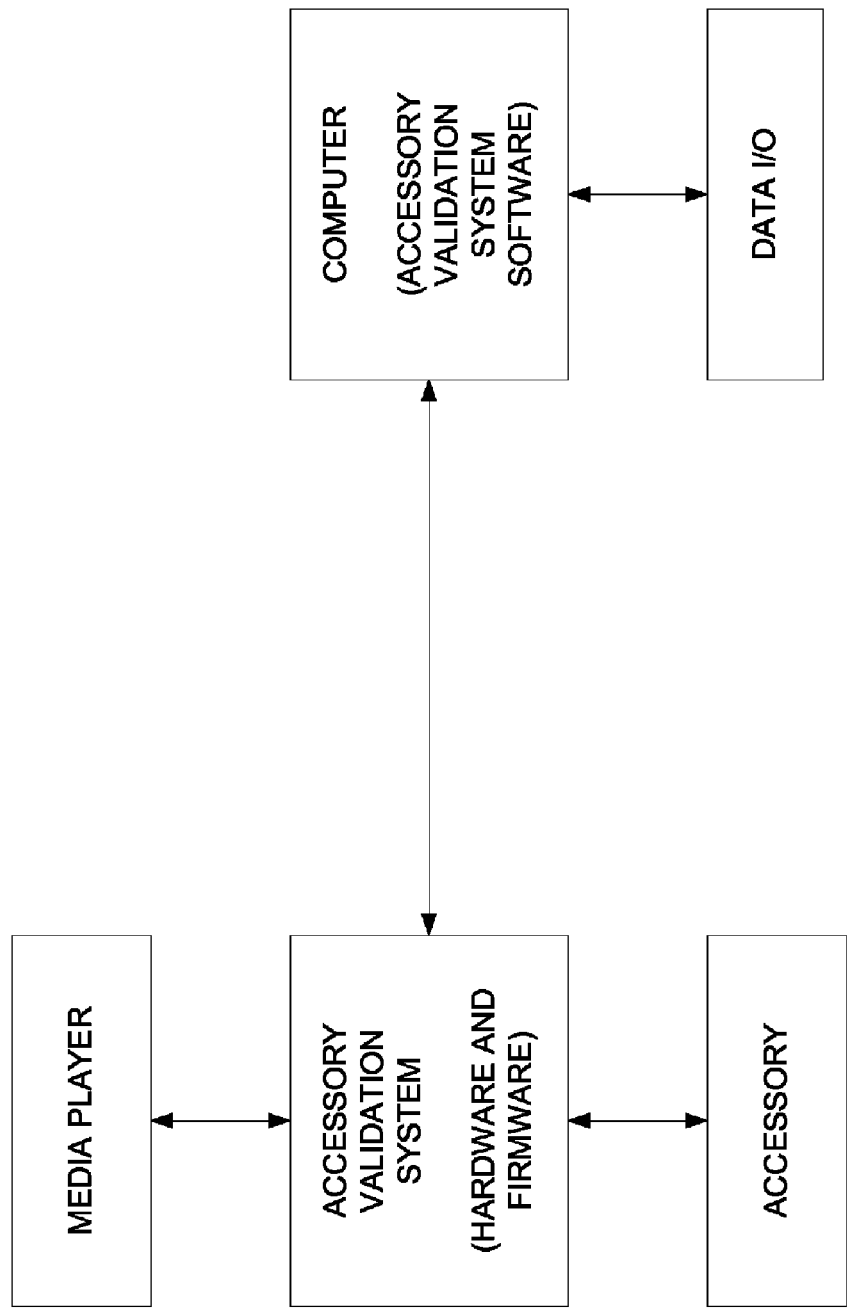
FIG. 1 is a block diagram of an accessory validation system according to an embodiment of the present invention.

FIG. 1 is a block diagram of an accessory validation system according to an embodiment of the present invention. This figure, as with the other included figures, is shown for illustrative purposes and does not limit either the possible embodiments of the preset invention or the claims.

This figure includes an accessory validation system that includes a hardware and firmware portion, as well as a software portion running on a computer. The accessory validation system hardware may be connected between an accessory under test and a media player, though for some tests a media player may not be required. The accessory validation system firmware resides on the accessory validation system hardware. The computer may be coupled to a data I/O that may include a terminal, mouse, and keyboard.

The accessory validation system hardware communicates with the accessory validation system software residing on the computer via a cable or by wireless transmission. The accessory validation system hardware may connect to the accessory using a physical connector, such as the 30-pin connector disclosed in copending U.S. application Ser. No. 10/423,490, titled Media Player System, which is incorporated by reference. Typically, the accessory provides a male or insert portion of a connector and the accessory validation system provides a female or receptacle portion of a connector for coupling to the accessory. In other embodiments of the present invention, the accessory validation system hardware connects to the accessory using either another type of connector or a wireless connection. Similarly, the accessory validation system hardware may connect to the media player using a 30-pin connector. Typically, the media player uses a female or receptacle portion of the connector and the accessory validation system hardware provides a male or insert portion of a connector for coupling to the media player. Other embodiments of the present invention employ other connectors, cables, or wireless connections. For example, wireless protocols such as Bluetooth, WiFi, 802.11, or other wireless standard or proprietary signaling may be used for one or more the connections discussed here.

In a specific embodiment of the present invention, the accessory validation system firmware may be updated by the accessory validation system software residing on the computer. In other embodiments of the present invention, the firmware may be updated using an Internet connection, by using a program written to a CD-ROM, or by other methods. The software can be updated using an Internet connection, CD-ROM, or by other methods.

The computer may be a computer manufactured by Apple Inc. of Cupertino, Calif. In other embodiments of the present invention, the accessory validation system hardware provides enough computing power and a user interface such that a separate computer is not needed. The media player may be one of several media players, for example, a media player manufactured by Apple Inc. Typically, an accessory is verified using a number of different types of media players.

Again, the accessory validation system is particularly useful in providing a mechanism for assuring consumers that an accessory properly operates with a particular media player. To provide such assurance, an embodiment of the present invention provides a method of certification whereby an accessory can be certified as being operable with one or more types of media players. A testing procedure for such a certification method that employs an accessory validation system is shown in the following figure.

Figure 2:
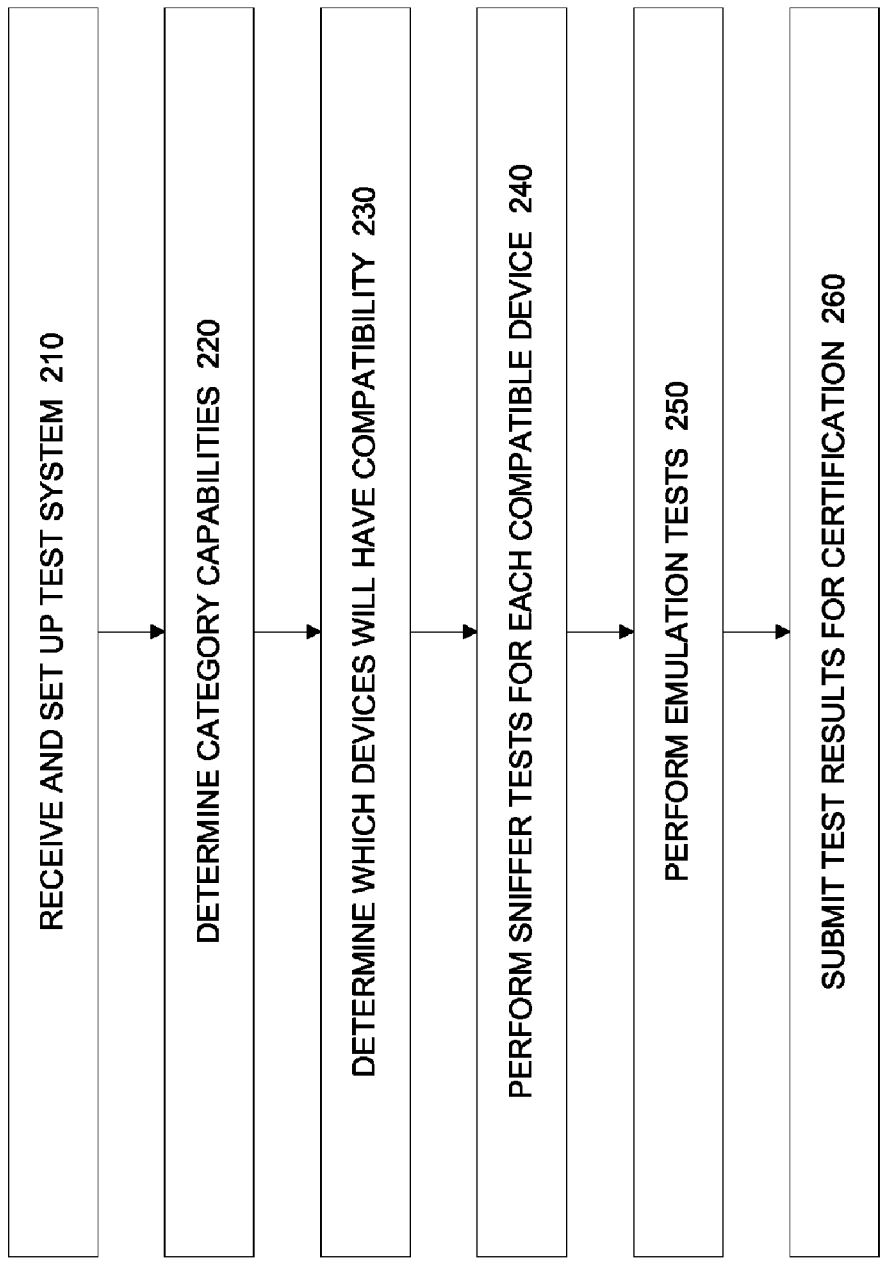
FIG. 2 illustrates a portion of an accessory certification process according to an embodiment of the present invention.

FIG. 2 illustrates a portion of an accessory certification process according to an embodiment of the present invention. In this example, the testing portion of the certification process involves testing an accessory with one or more media players and a media player emulator. In other embodiments of the present invention, the testing may be limited to the testing of an accessory with one or more media players, while other embodiments of the present invention only employ testing with a media player emulator.

Specifically, this accessory validation system provides testing in two modes. The first mode is referred to as a sniff mode. In sniff mode, the accessory communicates with a media player while an accessory validation system monitors traffic between them, such as data transfers, power on or off events, and the like. Testing in this mode may be repeated for a number of media players. In one embodiment of the present invention, testing may be performed with each media player that the accessory is to be certified as being operational. Sniff testing may be particularly useful in ensuring that an accessory operates with the actual media players for which it is being certified.

The second mode is referred to as an emulator mode. In this mode, the emulator mimics the operation of a media player and also provides erroneous and worst-case responses. Again, the accessory validation system monitors traffic between the accessory and an emulation portion of the accessory validation system. Emulator testing may be particularly useful for generating states and events that typically do not occur when using an actual media player in the absence of error or other unusual circumstance. For example, if an accessory is required to provide authentication information, if it provides the authentication information correctly, it will not receive a follow-up request for the same information from a functional media player. If testing is performed using only real media players, the accessory response to the follow-up request will not be tested. Accordingly, the emulator may be used to generate a follow-up request and test the accessory's response to it.

Specifically, in act 210, the test system components are received and the test system may be set up. A media player may be inserted and, depending on the accessory, the device may be turned on. In act 220, the capabilities of the accessory are determined. For example, it may be determined that the accessory has a remote control, can charge the media player, and provides an FM tuner function, but does not provide an FM transmitter. In act 230, it is determined which media players will be compatible with the accessory. This selection may be determined by the media player manufacturer. For example, to gain certification for a specific media player, certification for one or more other media players may be required to ensure interoperability and meet consumer expectations.

Once the intended capabilities and compatibility of the accessory is determined, sniff tests can be performed for each compatible device in act 240. Again, tests are performed with the accessory connected to a media player through an accessory validation system, and traffic between the accessory and the media player may be monitored. These tests are repeated for each device for which the accessory manufacturer is seeking to show compatibility.

In act 250, emulation tests may be performed. Again, these tests may mimic the operation of a media player. These tests may include purposefully sending erroneous data to the accessory, they may include sending signals having a worst-case (or "poor-case" timing), or other such "stress" testing. Further, these tests may involve repeatedly sending an instruction to the accessory.

In various embodiments of the present invention, results may be made available to a user. This may be particularly useful for debugging purposes in the event of an error. Also, in typical embodiments of the present invention, after testing, whether it is sniff testing, emulation testing, or both, results may be made available to a user. These results may be in one or more of a number of formats. For example, results may be presented in a simple pass/no pass or red light/green light manner, indicating whether the series of tests have been properly completed. More detailed responses showing traffic between an accessory and media player during an error may be provided. This traffic information may be supplemented with information regarding traffic before and after the error event. Also, if an event does not qualify as an error but would otherwise raise a concern, it may be highlighted as a warning to the user. Other information such as specific electrical characteristics may be provided. This may include component values, signal frequencies, voltage levels, and the like.

Once passing test results have been achieved for each compatible device, test results may be submitted for certification in act 250. To ensure the validity of the validation process, this data may be protected from tampering or alteration, for example by using a digital signature. If complete passing results are not yet available, in some embodiments of the present invention, partial or incomplete results may be sent, for example in an attempt to seek assistance.

Figure 3A:
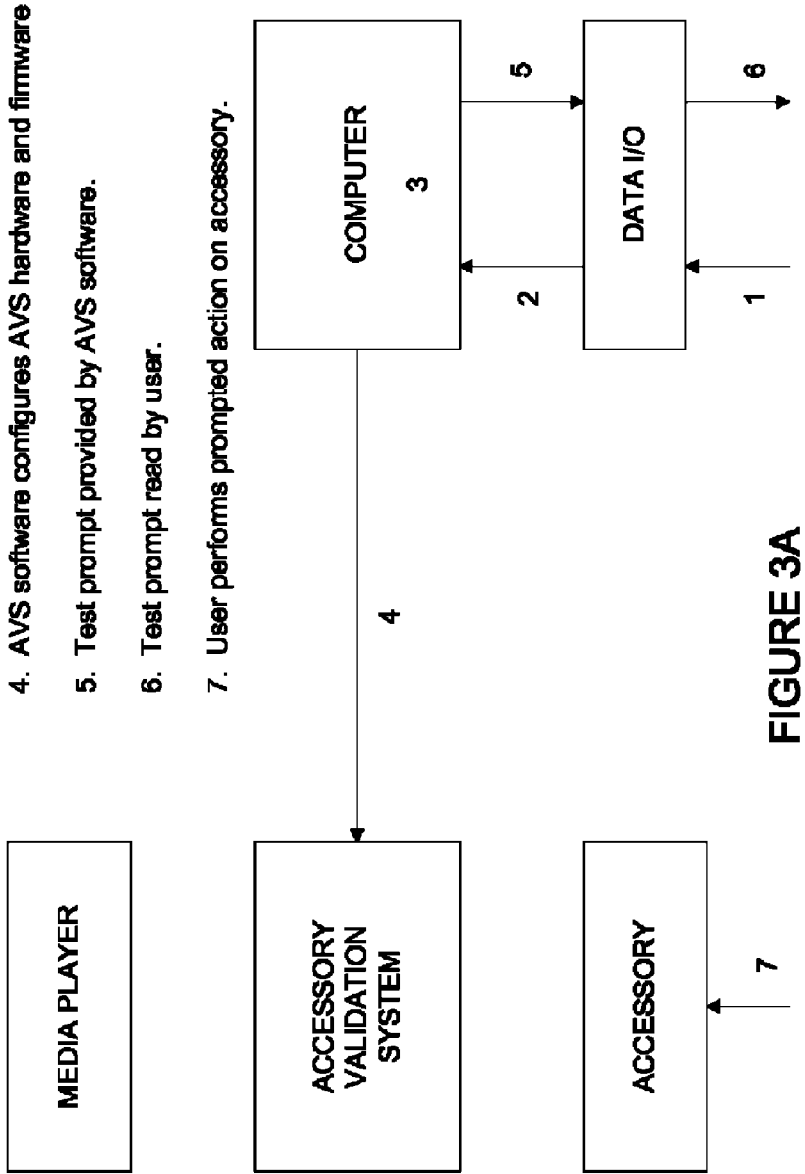

FIGS. 3A and 3B illustrate the activities in an accessory validation system during a sniff test according to an embodiment of the present invention. In FIG. 3A, a user, typically an accessory manufacture seeking certification enters category claims via a user interface by using a keyboard, or mouse, or other input device. Again, these category claims identify the functionality provided by the accessory. Example functions include a charger, remote control, FM tuner, and others. Following that, the accessory validation software receives the category claims. The accessory validation software then generates rules from the category claims. These rules identify the performance requirements of the accessory. Examples of rules include sending a proper play/pause command when a play/pause button on an accessory is pressed and waiting for an acknowledgement before resending the play/pause command.

From these rules, the software then generates sniff tests. The accessory validation system software then configures the accessory validation system hardware and firmware for the tests. Often, the hardware may be reconfigured for every test or for every group of tests. A test prompt may be then provided by the accessory validation system software to the user via a user interface. The test prompt may be as simple as "press the play/pause button." The test prompt may be then read by the user, typically on a monitor, and the user performs the prompted action on the accessory.

In FIG. 3B, the accessory sends signals to the media player via the accessory validation system. The media player may respond to the accessory, for example with an acknowledgment that it has paused. The accessory validation system hardware provides sniff data to the accessory validation system software. From this, the accessory validation software can determine results, including error data. These results may be provided to the user via the user interface. The user typically reads the results via a monitor. In the case of errors, the user may review data to determine the cause of the error.

Typically, the accessory validation system software prompts the user to perform a series of tests. Before each test, the accessory validation system software reconfigures the accessory validation system hardware and firmware for the upcoming test. During each test, the accessory validation system sniffs the activity between the accessory and the media player. Following each test, the accessory validation system software determines the presence of an error, though in various embodiment of the present invention, the presence of errors may be determined following a number tests or after all of the tests have been completed. Sniff testing is explained further in the following figure.

Figure 4:
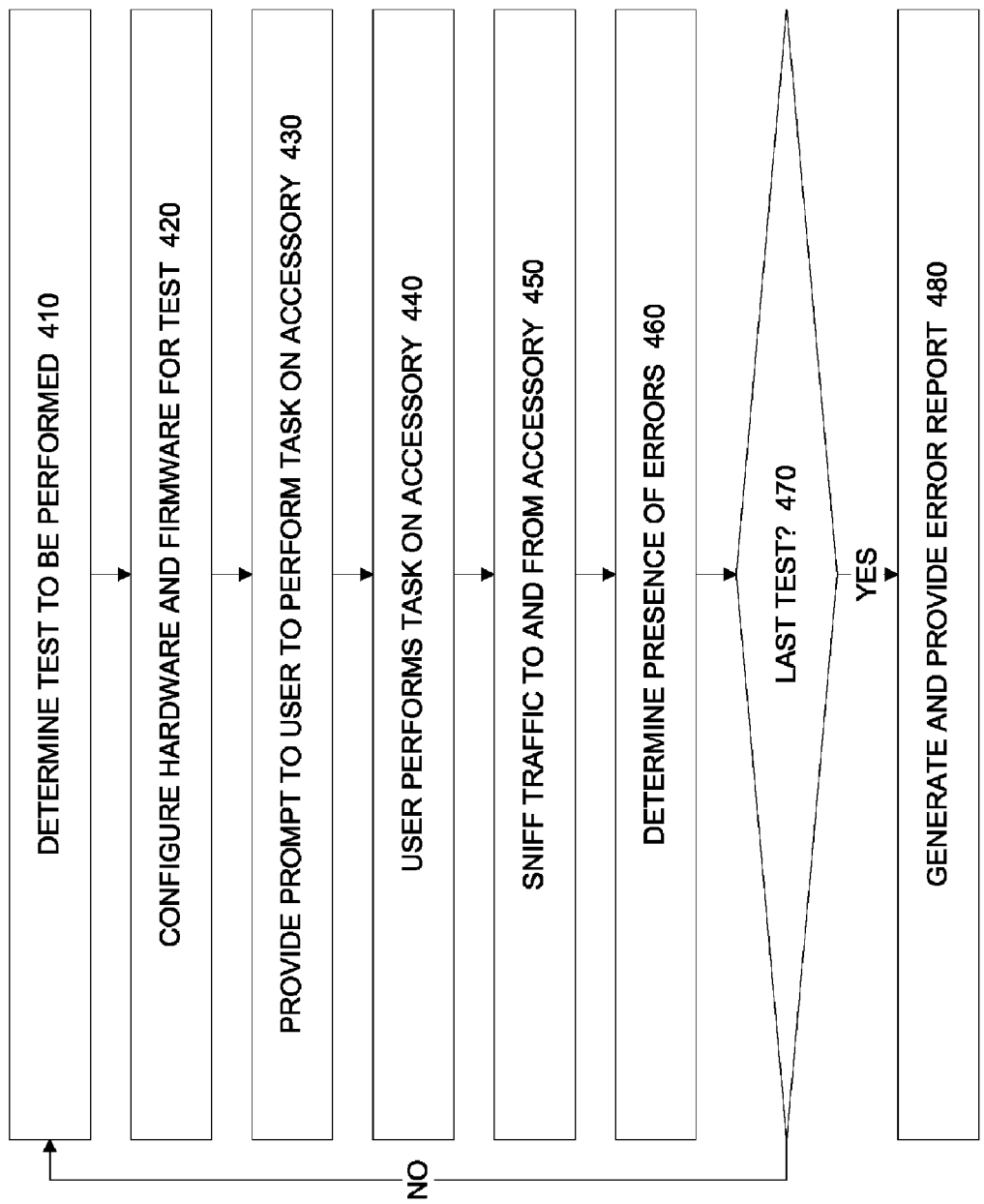
FIG. 4 illustrates the steps performed during testing with an accessory validation system according to an embodiment of the present invention.

FIG. 4 illustrates the steps performed during testing with an accessory validation system according to an embodiment of the present invention. These acts are used for testing in both sniff and emulation mode. In this figure, category claims and compatibility claims have been entered, rules have been generated using these claims, and from these rules, a list of required tests has been generated.

In act 410, the first (or next) test to be performed is determined. In act 420, the accessory validation system software configures the accessory validation system hardware and firmware. In act 430, a prompt is provided to the user to perform a specific task on an accessory. In act 440, the user performs the task. Again, an example of a test is to press a play/pause button. In act 450, traffic to and from the accessory is sniffed by the accessory validation system hardware and provided to the accessory validation system software. The presence of errors is determined in act 460. In act 470, it is determined whether the last test has been run. If it has, an error report may be generated and provided in act 480. If not, then the next test to be performed is determined in act 410, and the testing sequence begins anew.

Again, embodiments of the present invention may provide either or both a test mode and an emulation test mode. A flowchart illustrating sniff testing is shown in the following figure.

Figure 5:
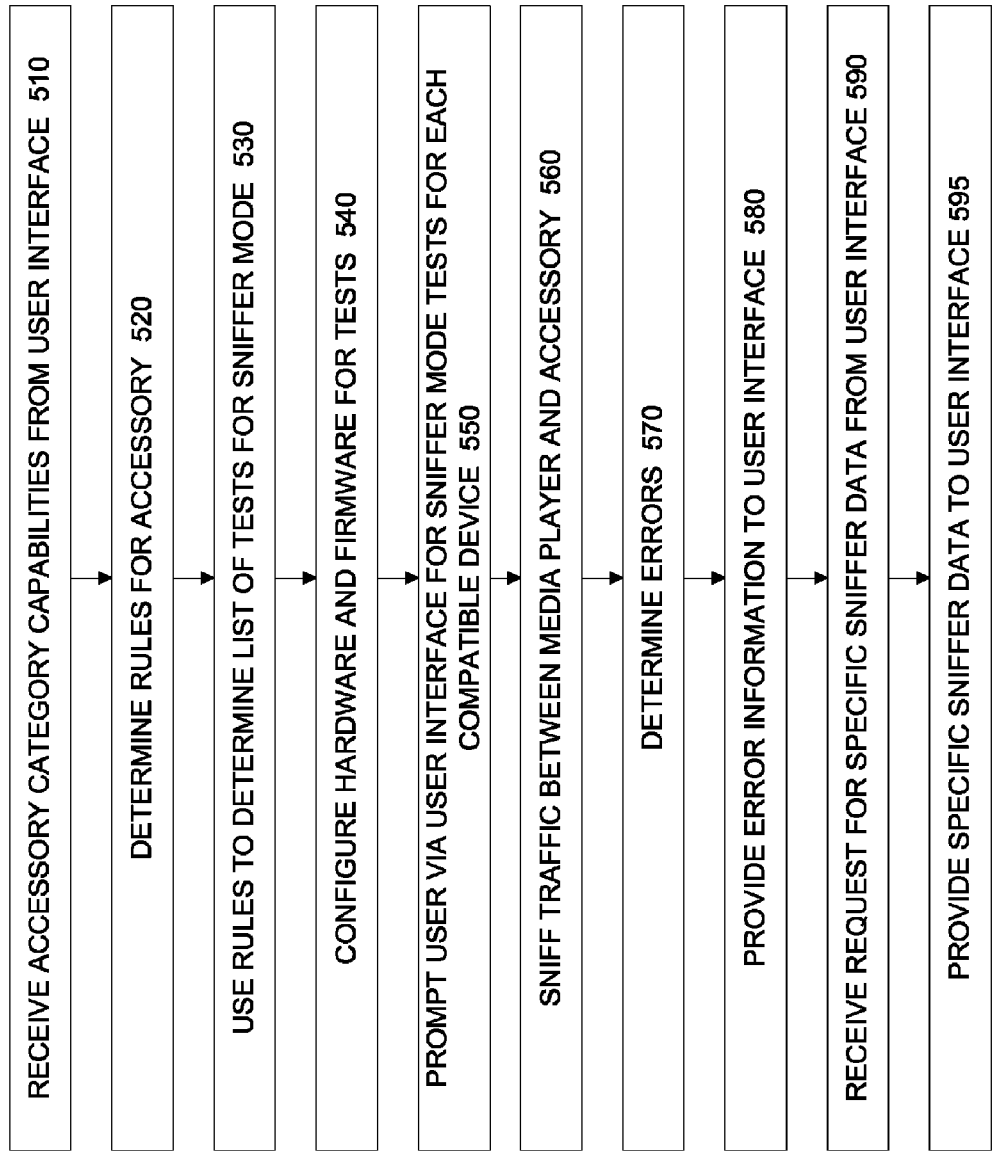
FIG. 5 is a flowchart of a method of performing sniff tests according to an embodiment of the present invention.

FIG. 5 is a flowchart of a method of performing sniff tests according to an embodiment of the present invention. In act 510, accessory category capabilities or claims are received via a user interface. In act 520, rules for the accessory are determined. In act 530, these rules are used to determine sniff tests. In various embodiments of the present invention, other tests, such as tests defined by a user, may be included. In act 540, the software configures the hardware and firmware. A user may be prompted via a user interface to perform tasks for the sniff tests. Again, this may be repeated for each type of media player for which compatibility certification is sought. While the tests are conducted, traffic between the media player and accessory are monitored in act 560. In act 570, the presence of errors is detected. The error information may be provided to the user via the user interface in act 580. The user may request specific data via the user interface. For example, sniff data captured during an error condition may be requested. This information may be provided via the user interface in act 595.

Testing performed in both sniff and emulation modes may test the accessory at one or more levels. These levels are described in the following figure.

FIG. 6 illustrates the levels of testing performed by an embodiment of the present invention. In this example, the lowest level is the hardware or physical level. Testing of this level involves determining whether the accessory is providing signal levels having the proper voltages, and other such characteristics.

The next level is the transport level. Testing of this level involves ensuring that the data signals provided by the accessory have the correct frequency and other such characteristics.

The intermediate level is the packet structure later. This level may be tested by checking the structure of each data packet sent to the media player. For example, a pause/play instruction, which is an instruction to pause if playing and play if paused, may be tested to determine whether it is properly organized such that it can be understood by the media player.

The next level is the multi-packet logic level. Testing at this level checks that packets are sent in a logical manner. For example, after a particular media player receives a play/pause instruction, it should send an acknowledgment signal back to the accessory. The accessory should wait for this acknowledgment signal before sending a status request to the media player. If the accessory sends the status request to the media player before it receives this acknowledgment signal, the accessory cannot know whether the media player is responding to the status request with the status before the original play/pause instruction. This may lead to an unfortunate circumstance where the media player responds that it is playing and then pauses in response to the first play/pause instruction, only to receive a second play/pause command, which causes it to resume playing.

The highest level in this example is the accessory category capabilities level. This testing involves whether the accessory has a particular capability. For example, if the accessory is to have the capability of acting as a remote, the accessory needs to be able to pause, play, skip, and the like. Only if it can perform each of these required functions can the accessory pass this category capability level.

In various embodiments of the present invention, some or all of these tests may be performed using an accessory validation system. For example, for a USB device, a third-party USB tester may be used to test the hardware and transport level, while an accessory validation system may be used to test the upper three levels. For example, as described above, a media player may connect to an accessory in a wireless manner, for example using 802.1a, b, g, Bluetooth, WiFi, WiLAN, or other wireless standard. While testing, the wireless transmissions between the accessory and media player may be sniffed by the accessory validation system hardware. In such a case, the accessory validation system may test the wireless connection itself, that is, it may test the lowest two levels. Alternately, another test system may be used to test the physical and transport levels. Testing of all five of these levels is illustrated in the following figure.

Figure 7:
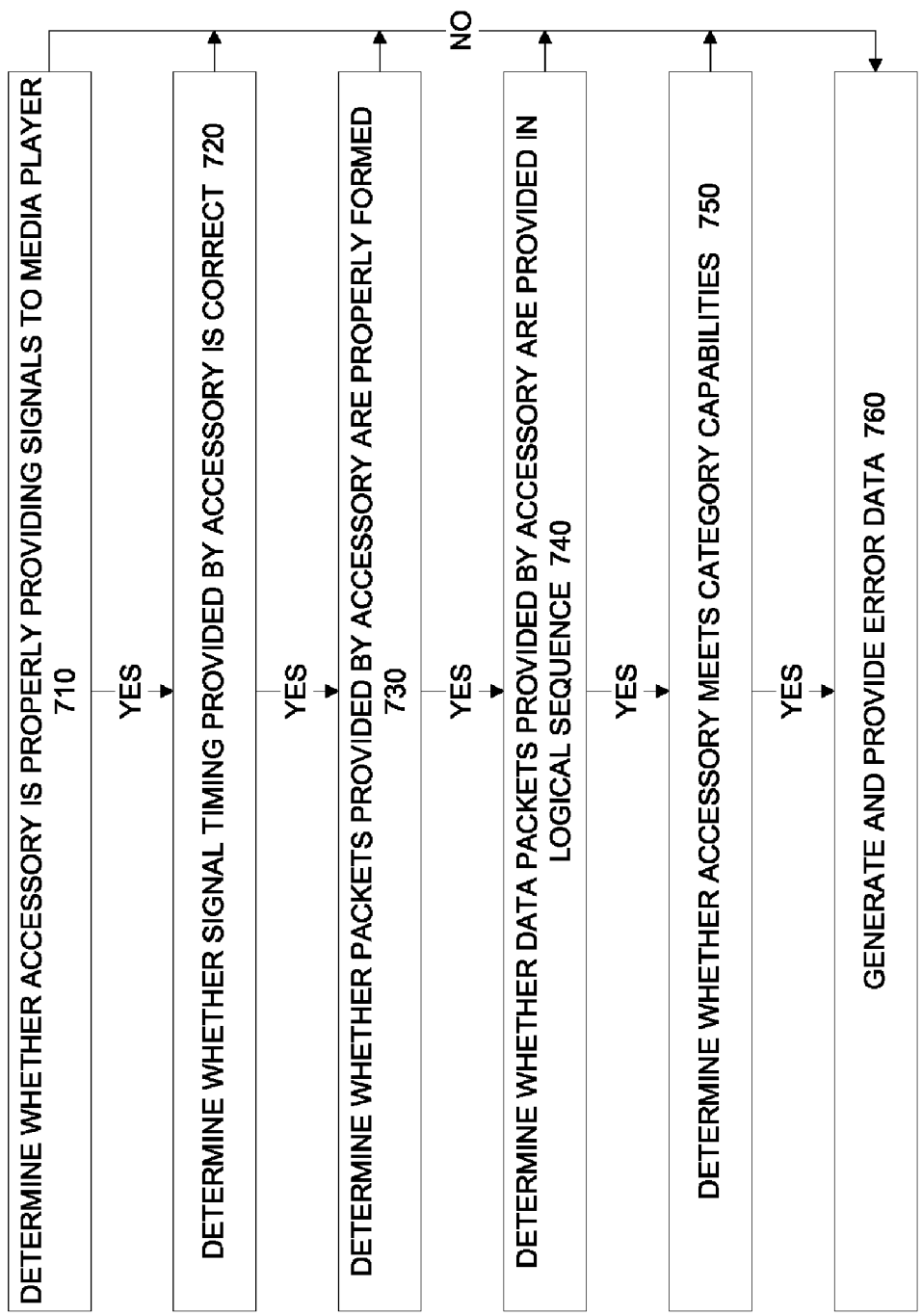
FIG. 7 illustrates a method of determining whether errors have occurred during testing according to an embodiment of the present invention.

FIG. 7 illustrates a method of determining whether an accessory has made an error during testing according to an embodiment of the present invention. It is determined whether the accessory is properly providing signals to the media player in act 710. In act 720, it is determined whether the timing and other such parameters for the signals provided by the accessory are correct. In act 730, it is determined whether the packets provided by the accessory are properly formed. It is determined whether the packets provided by the accessory are provided in logical sequence in act 740. In act 750, it is determined whether the accessory meets the category capabilities that are claimed. If there is an error at any of these steps, the testing process may either continue or error data may be generated and provided to a user interface, depending on an exact implementation of an embodiment of the present invention.

Again, embodiments of the present invention provide either or both a sniff-testing mode and an emulation-testing mode. An emulation mode according to an embodiment of the present invention is discussed in the following figures. In these figures, since the accessory validation system is acting as an emulator, a media player may not be required; though it may typically remain attached for convenience purposes when emulation mode testing is combined with sniff testing.

Figure 8A:
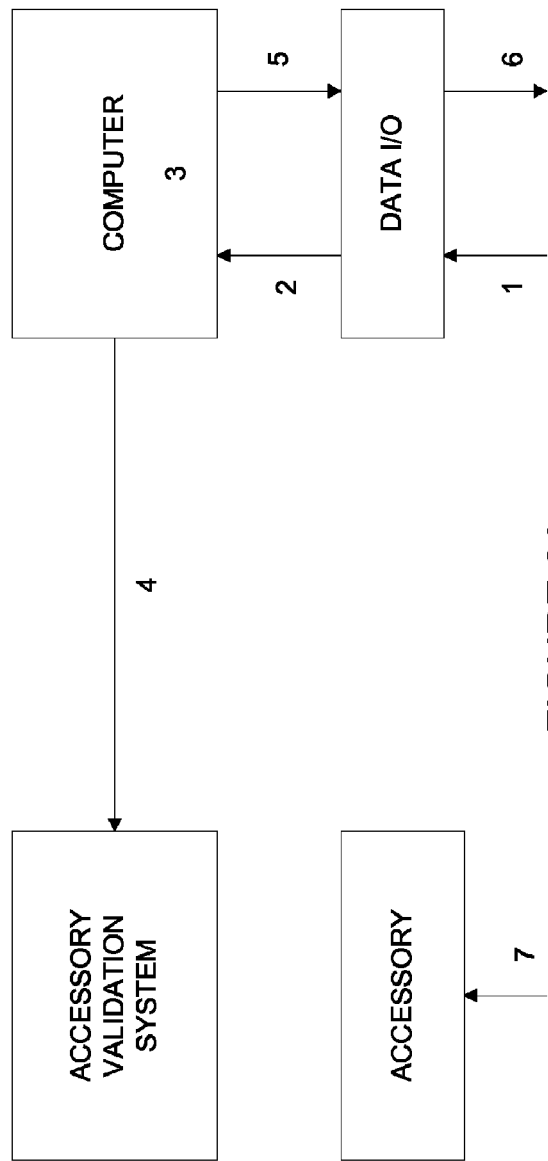
FIGS. 8A and 8B illustrate the activities in an accessory validation system during emulation testing according to an embodiment of the present invention.
Figure 8B:
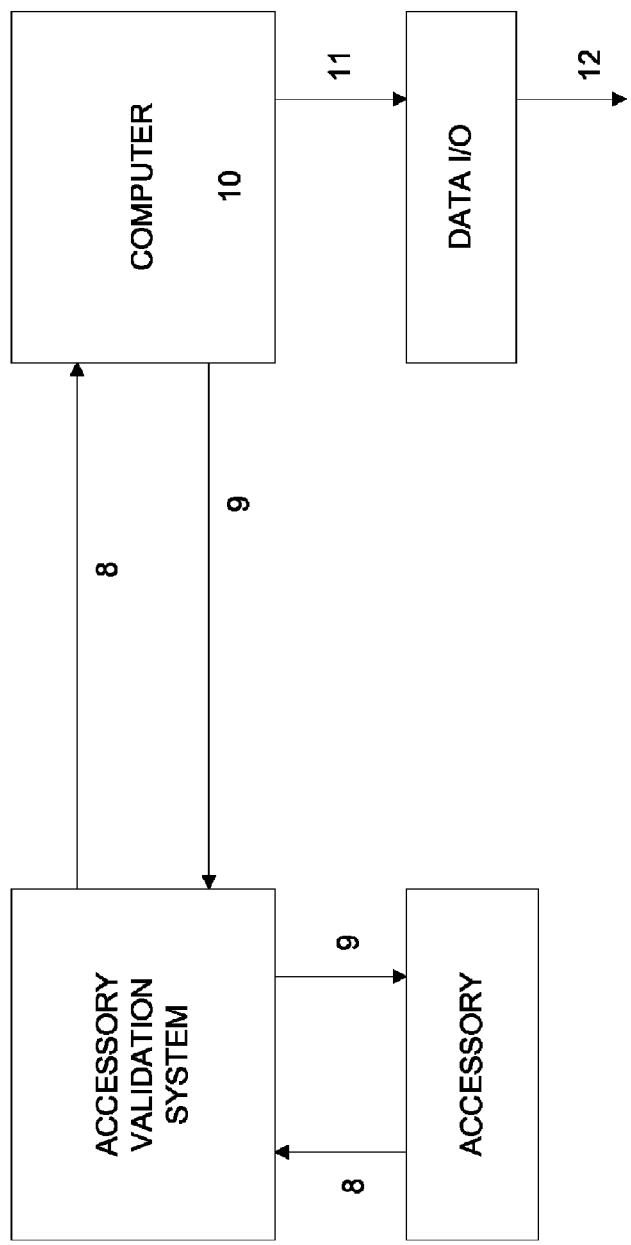

FIGS. 8A and 8B illustrate the activities in an accessory validation system during emulation testing according to an embodiment of the present invention. In FIG. 8A, a user, again typically an accessory manufacturer, inputs category claims using a user interface. The accessory validation system software receives the category claims. The accessory validation system software then generates rules from the category claims. From these rules, the accessory validation system software generates emulation tests. The accessory validation system software configures the accessory validation system hardware and firmware for each test. The accessory validation system software provides test prompts. Test prompts are read by the user, who then performs the prompted action on the accessory.

In FIG. 8B, the accessory sends signals to the accessory validation system. The accessory validation system responds to the accessory as a media player. From this signaling, the accessory validation system determines results such as error events and provides them to the user via the user interface. The user may then read the results. A flowchart outlining this is shown in the following figure.

Figure 9:
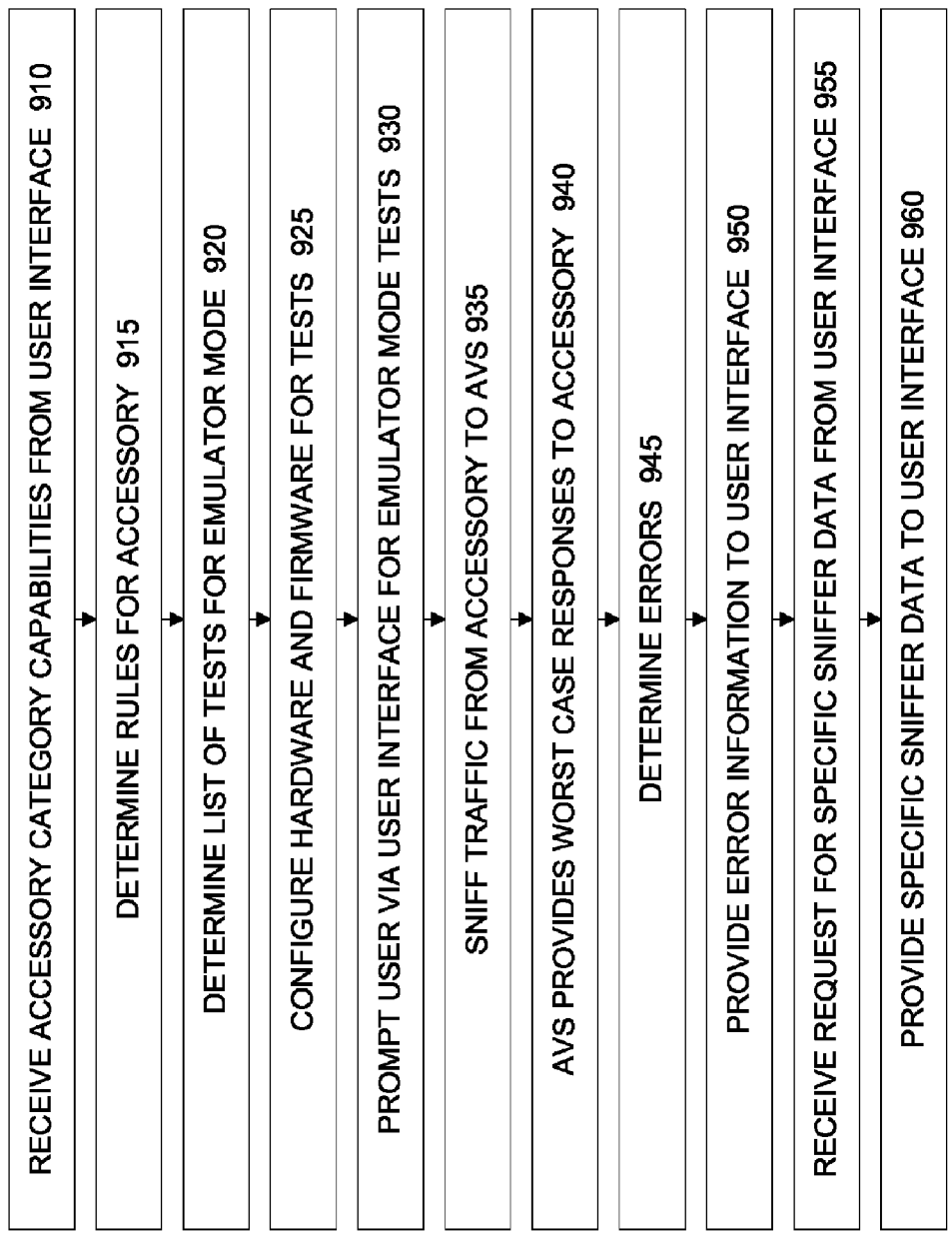
FIG. 9 is a flowchart of a method of performing emulation tests according to an embodiment of the present invention.

FIG. 9 is a flowchart of a method of performing emulation tests according to an embodiment of the present invention. In act 910, accessory category capabilities are received from a user interface. Rules for the accessory are determined from the claimed accessory categories in act 915. In act 920, lists of tests for the emulator mode are determined. In various embodiments of the present invention, the user may add tests to the test list. The accessory validation system hardware and firmware are configured for these tests in act 925. Again, the hardware and firmware may be typically configured before each or every group of tests; this process is shown once for simplicity. The user may be prompted to perform the tests. Instructions and other information sent from the accessory to the accessory validation system are sniffed in act 935. In act 940, a response may be provided by the accessory validation system. This response may have a worst-case property associated with it.

In act 945, the presence of errors is determined. This error information is provided to the user interface in act 950. In act 955, a request for specific sniff data from the user interface may be received. For example, the user may be interested in a particular error event. The specifics of the error data may be provided to the user via the user interface in act 960.

Figure 10:
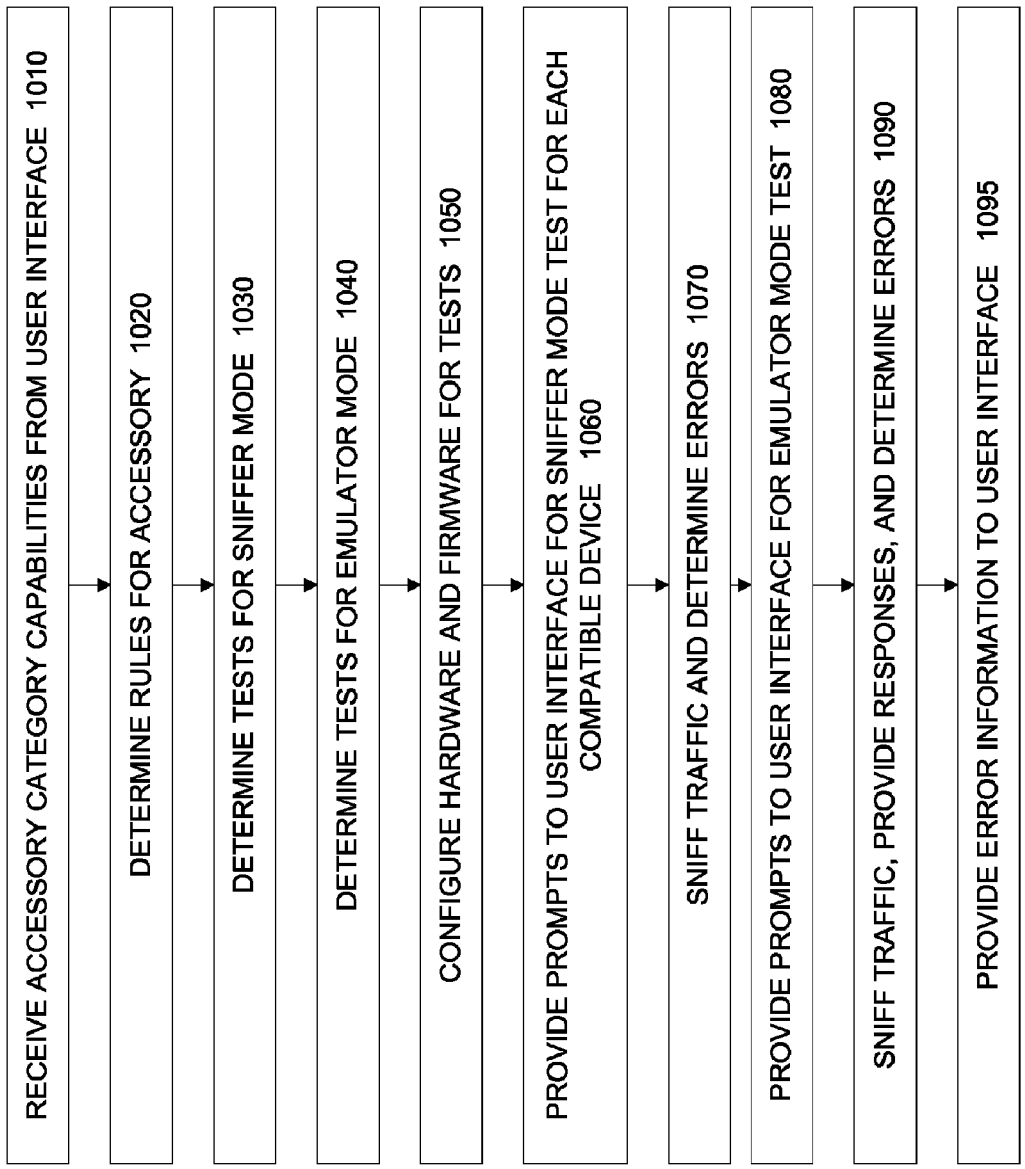
FIG. 10 is a flowchart of an accessory validation system operating in both in the sniff and emulator modes according to an embodiment of the present invention.

FIG. 10 is a flowchart illustrating an accessory validation system operating in both in sniff and emulator modes according to an embodiment of the present invention. As before, accessory category capabilities or claims are received from a user interface in act 1010. From these category claims, rules for the accessory are determined in act 1020. In act 1030, tests for a sniff mode are determined. Tests for an emulator mode are determined in act 1040.

The accessory validation system hardware and firmware are configured in act 1050. Again, they are typically configured before each test, or before each group of tests; configuration is shown once for simplicity. In act 1060, prompts are provided to the user interface for the sniff mode test. Again, this may be done for each compatible device. In act 1070, traffic between the accessory and the accessory validation system are sniffed and from this data errors are determined.

In act 1080, prompts are provided to the user interface for the emulator mode tests. Again, traffic between the accessory and accessory validation system is sniffed, responses are provided, and errors are determined in act 1090. This error information may be provided to the user via a user interface in act 1095.

Exemplary screenshots illustrating information provided by an accessory validation system to a user via a user interface are shown in the following figures.

Figure 11:
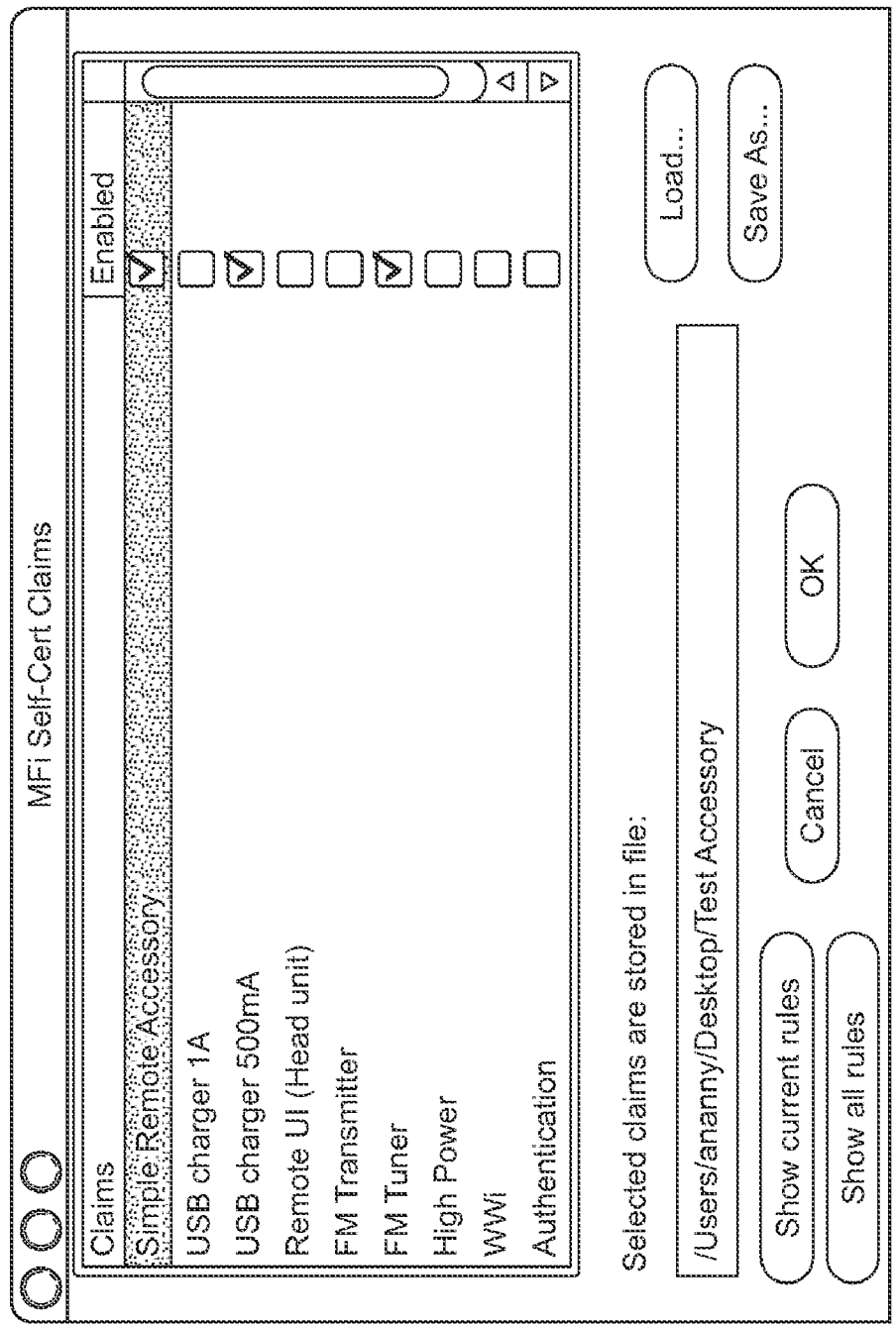
FIG. 11 illustrates a menu for entering category compatibility claims according to an embodiment of the present invention.

FIG. 11 illustrates a menu for entering category compatibility claims according to an embodiment of the present invention. It is desirable that these compatibility claims be specific enough to narrowly identify functions for accessory. That is, if an accessory is to operate as a remote, it need not have the capabilities of an FM tuner, so these can be separate compatibility claims. It is also desirable that these compatibility claims be broad enough that they capture functions that a user would expect them to have. For example, accessory operating as a remote should be able to pause, play, skip songs, and the like. A remote that does not perform a pause function would not live up to consumer expectations. However, making an accessory manufacturer identify the pause function as a requirement would be unduly burdensome and limit the usefulness of the accessory validation system.

In this example, a user enters these category claims by checking an enable box. This particular accessory includes a remote, a USB charger, and an FM tuner. This accessory may be a boom box having an FM radio, or other similar device.

Figure 12A:
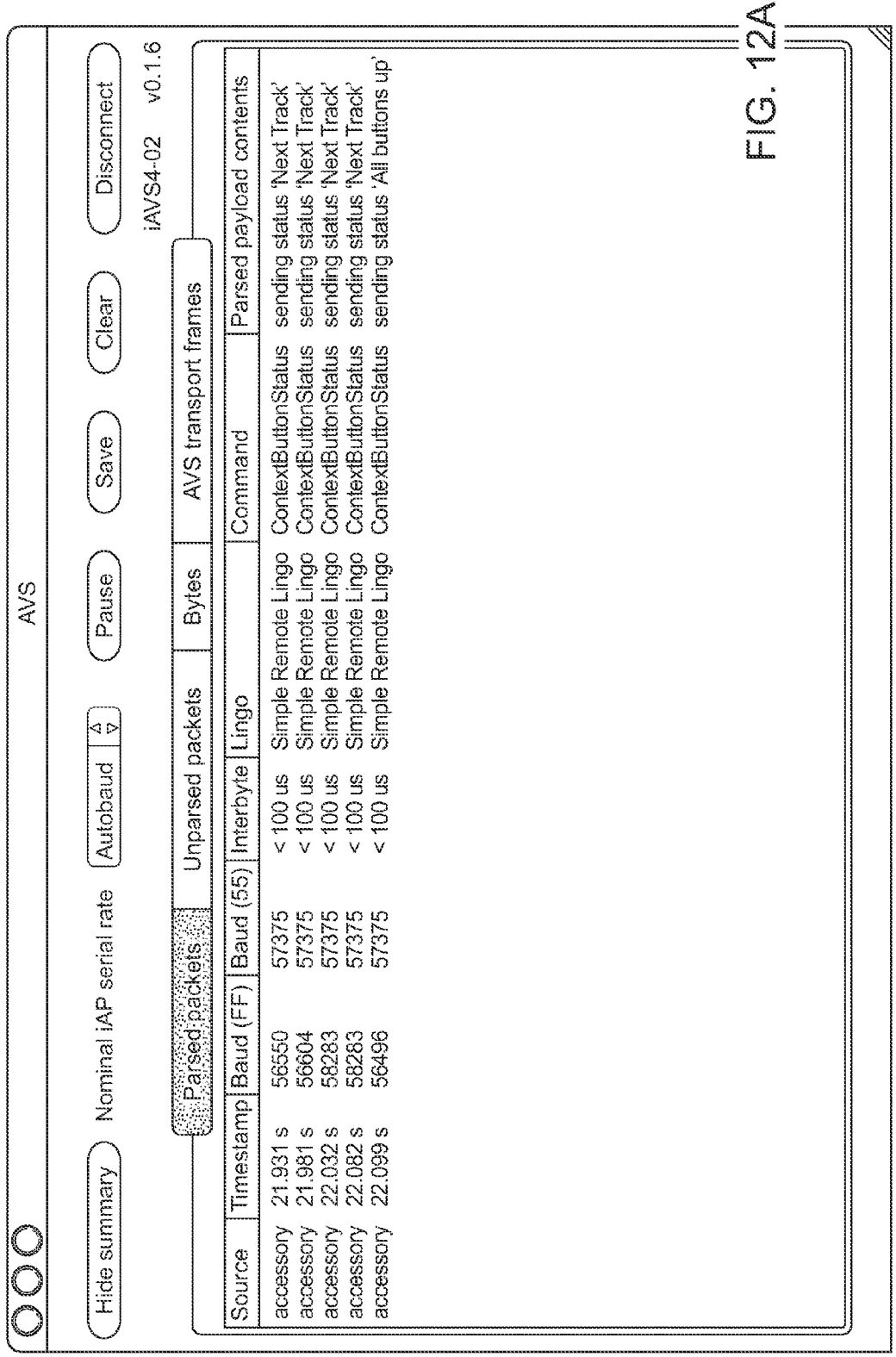

FIGS. 12A-12C are screenshots showing information provided to a user during a sniff mode test, or during an emulation mode test when sniff data is being provided, for example to determine the source of an error. FIG. 12A illustrates a first window showing real-time or captured sniff data as well as a second window illustrating electrical information and other data.

FIG. 12B is a detailed shot of the left window of FIG. 12A. This figure illustrates real-time or previously captured traffic between an accessory and a media player via or accessory validation system hardware emulator. This screen provides a list of transactions such that accessory hardware, firmware, or software can be debugged. In this example, it can be seen that the accessory is sending several consecutive signals instructing the media player to skip forward to the next track.

FIG. 12C is a detailed shot of the right window in FIG. 12A. Various electrical, transport, and other information may be shown in this window for error debugging and other purposes. For example, in the electrical window, the state of an accessory detect pin is shown. In an exemplary accessory, this pin is held low such that the media player can detect it. When the media player senses this pin going low, it can determine that it is attached to an accessory. Identification resistors, charging voltages, and other information can be graphically included in this window as well. The serial transport window indicates the data rate and errors associated with the data rate provided by the accessory. Other information, such as accessory identification and authentication, may also be shown.

Figure 13:
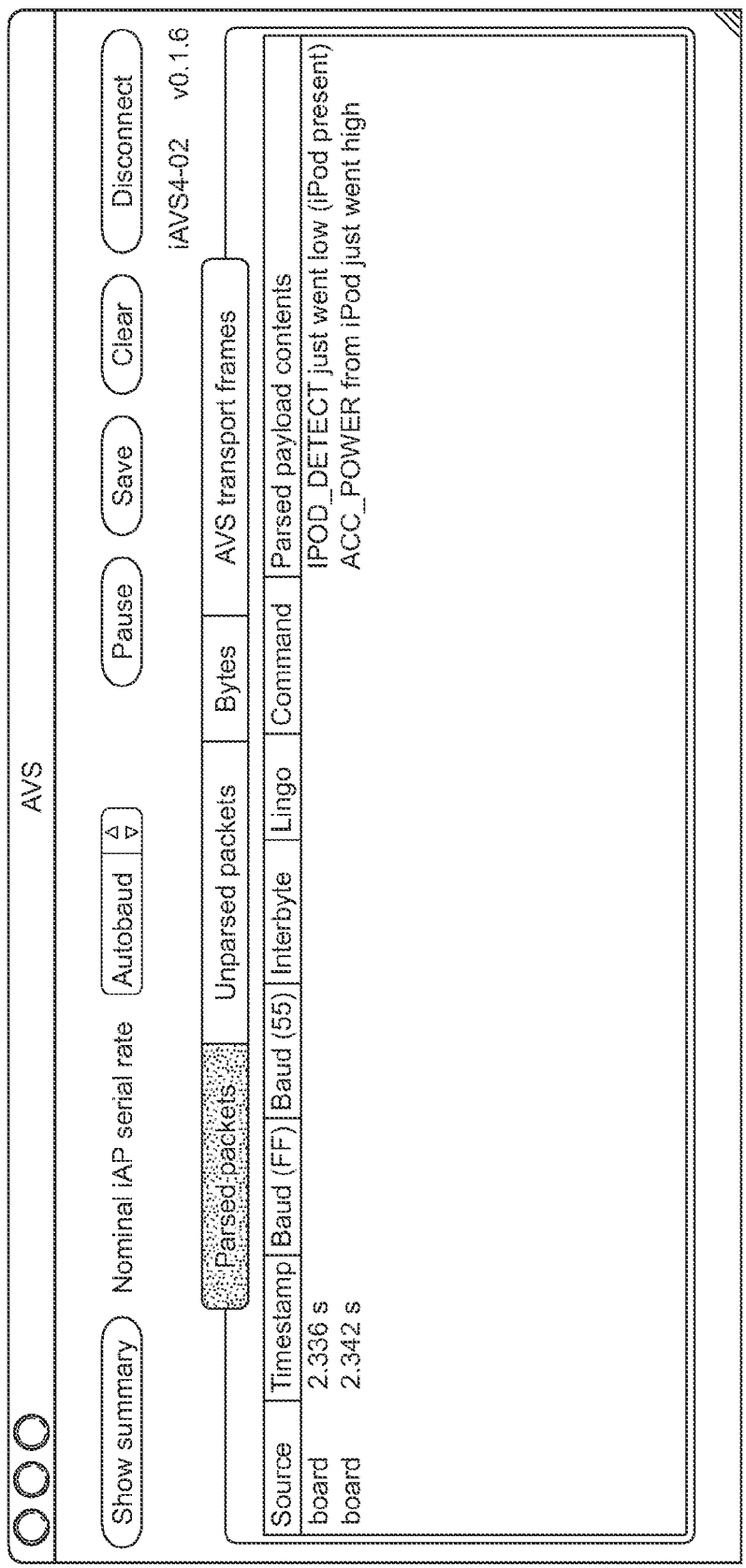
FIG. 13 illustrates sniffer data generated by the accessory validation system when a media player is connected to the accessory NVIDIA in the accessory validation system hardware.

FIG. 13 illustrates sniffer data generated by an accessory validation system when a media player is connected to an accessory via the accessory validation system hardware. In the first line, the media player is detected, while the application of power to the media player is detected in the second line.

Figure 14:
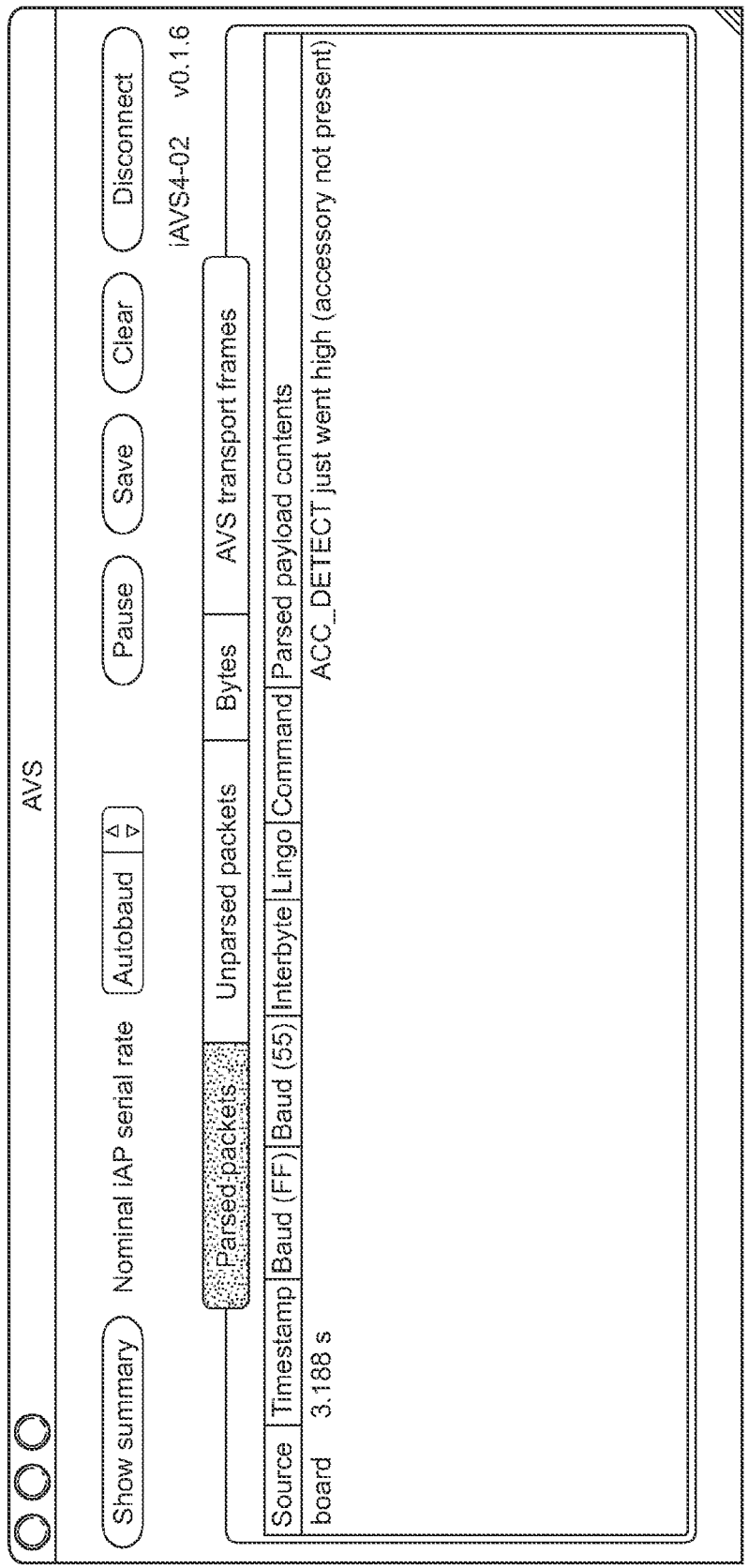
FIG. 14 illustrates real-time or stored sniffer data indicating that the accessory has been disconnected.

FIG. 14 illustrates real-time or stored sniffer data indicating that the accessory has been disconnected. This information may be provided as the accessory is disconnected, or as a stored data stream that can be used to determine when the accessory was disconnected.

Figure 15:
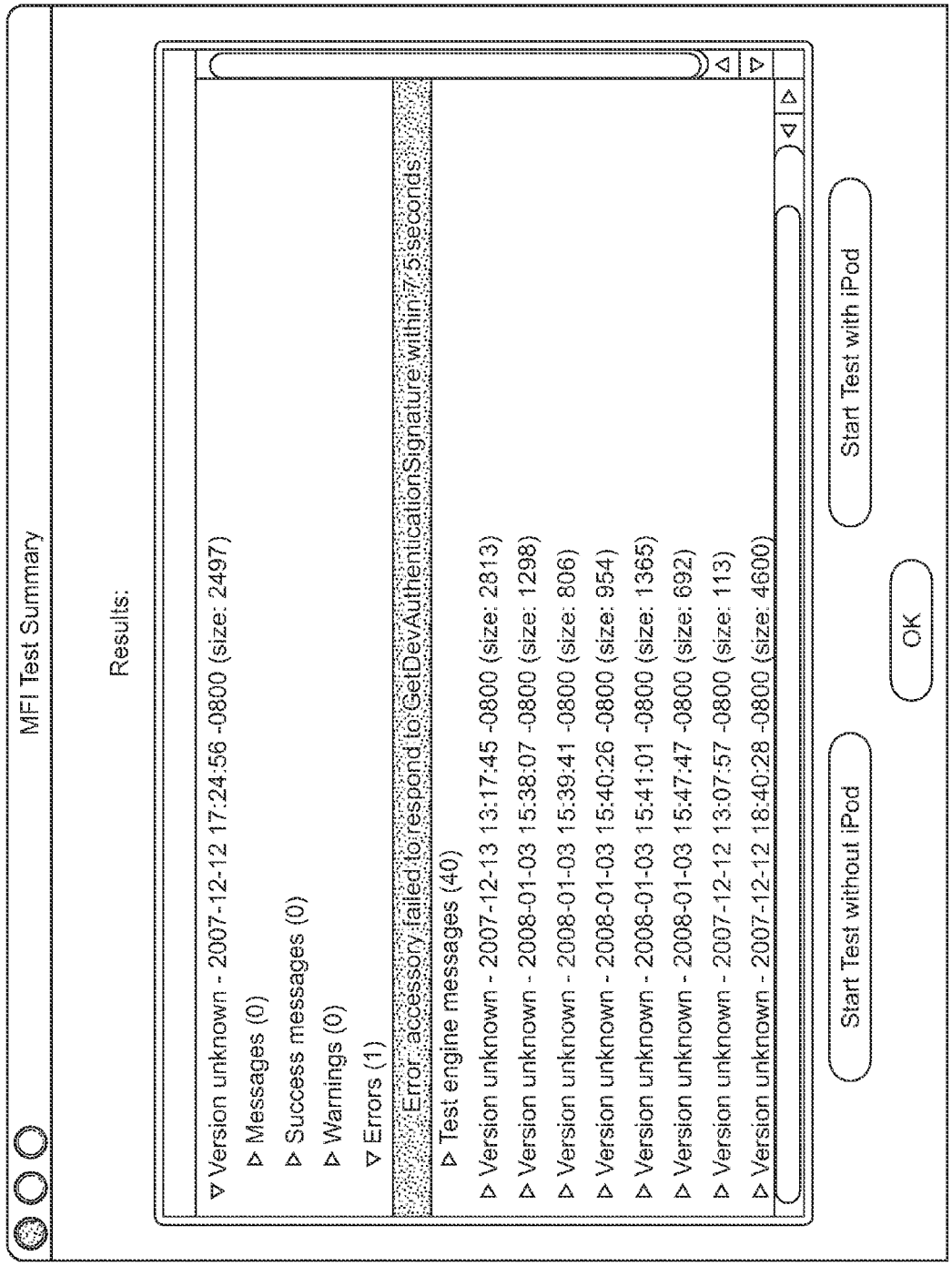
FIG. 15 illustrates a tests summary window that may be provided via a user interface according to an embodiment of the present invention.

FIG. 15 illustrates a test summary window that may be provided via a user interface according to an embodiment of the present invention. Again, after testing is at least partially completed, results may be provided to the user via the user interface.

If an error occurs, such as the error shown here, the line showing the error may be selected. This causes the software to provide to the user interface the specific sniffer data associated with the error. This error data can be shown in a window such as the window in FIG. 12A. Typically, it is also useful that data transfers before and after the occurrence of the error may also be provided.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of testing an electronic accessory comprising:
providing a plurality of possible functional capabilities that can be performed by one or more types of electronic accessories;
receiving an identification of at least one of the plurality of possible functional capabilities for a particular electronic accessory;
using the identified at least one of the plurality of possible functional capabilities to generate a plurality of rules that identify requirements for the particular electronic accessory; and
using the plurality of rules to generate-a plurality of tests for testing the particular electronic accessory.

2. A method of testing an accessory comprising:
providing a plurality of possible functional capabilities;
receiving an identification of at least one of the plurality of possible functional capabilities;
using the identified at least one of the plurality of possible functional capabilities to generate a plurality of rules, where the plurality of rules comprises a plurality of requirements for the accessory; and
using the plurality of rules to generate a plurality of tests for testing the accessory;
selecting a first test from the plurality of tests;
providing configuration information to a test unit for the first test; and
providing a prompt for an action to be performed on the accessory for the first test.

3. The method of claim 2 further comprising:
receiving first information regarding one or more packets transmitted by the accessory.

4. The method of claim 3 further comprising:
storing and displaying second information regarding the one or more packets transmitted by the accessory.

5. The method of claim 3 further comprising receiving second information regarding one or more packets transmitted by a media player.

6. The method of claim 3 further comprising:
generating one or more packets to be provided to the accessory.

7. The method of claim 2 wherein the prompt is provided using a user interface.

8. An electronic testing system comprising:
an electronic testing unit comprising:
a first connector to connect to an accessory;
a second connector to connect to a computer;
first electronic circuitry to detect electronic signals received at the first connector; and
second electronic circuitry to provide information regarding the detected electronic signals to the second connector; and
a computer program residing on a computer and comprising:
code for providing a plurality of possible functional capabilities;
code for receiving an identification of at least one of the plurality of possible functional capabilities;
code for using the identified at least one of the plurality of possible functional capabilities to generate a plurality of rules, where the plurality of rules comprises a plurality of requirements for the accessory; and
code for using the plurality of rules to generate a plurality of tests for testing the accessory.

9. The electronic testing system of claim 8 wherein the computer program further comprises:
code for selecting a first test from the plurality of tests;
code for providing configuration information to the electronic testing unit for the first test; and
code for providing a prompt for an action to be performed on the accessory for the first test.

10. The electronic testing system of claim 9 wherein the computer program further comprises:
code for receiving first information regarding one or more packets transmitted by the accessory.

11. The electronic testing system of claim 10 wherein the computer program further comprises:
code for storing second information regarding the one or more packets transmitted by the accessory; and
code for displaying the second information regarding the one or more packets transmitted by the accessory.

12. The electronic testing system of claim 10 wherein the computer program further comprises:
code for receiving second information regarding one or more packets transmitted by a media player.

13. The electronic testing system of claim 10 wherein the computer program further comprises:
code for generating one or more packets to be provided to the accessory.

14. The electronic testing system of claim 8 wherein the electronic testing unit further comprises:
third electronic circuitry to interpret at least some of the electronic signals received at the first connector as commands.

15. The electronic testing system of claim 9 wherein the second electronic circuitry provides information regarding the interpreted commands to the third connector.

16. The electronic testing system of claim 8 wherein the electronic testing unit further comprises:
third electronic circuitry to receive information regarding electronic signals to be provided at the first connector.

17. The electronic testing system of claim 8 wherein the electronic testing unit further comprises:
third electronic circuitry to provide electronic signals at the first connector.

18. The electronic testing system of claim 8 wherein the computer program further comprises:
code for determining whether one or more electrical characteristics of signals detected at the first connector meet one or more test limits for one or more tests.

19. The electronic testing system of claim 18 wherein the computer program further comprises:
code for determining whether one or more signal characteristics of signals detected at the first connector meet one or more test limits for one or more tests.

20. The electronic testing system of claim 19 wherein the computer program further comprises:
code for determining whether the signals detected at the first connector form one or more packets that comply with one or more tests.

21. The electronic testing system of claim 20 wherein the computer program further comprises:
code for determining whether one or more packets are detected at the first connector in a sequence that complies with one or more tests.

22. The electronic testing system of claim 21 wherein the computer program further comprises:
code for determining whether the accessory meets all tests for the identified functional capabilities.

23. An electronic testing unit comprising:
a first connector to connect to an accessory;
a second connector to connect to a media player;
a third connector to connect to a computer; and
electronic circuitry that enables the testing unit to operate in first and second test modes where in the first test mode the electronic circuitry monitors electronic signals received at and sent to the first connector, and in the second test mode the electronic circuitry mimics the operation of an electronic accessory, the electronic circuitry further including circuitry to provide information regarding results of the first and second test modes to the third connector.

24. The electronic testing unit of claim 23
wherein the electronic circuitry to interprets at least some of the electronic signals received at the first connector as commands.

25. The electronic testing unit of claim 24 wherein the electronic circuitry provides information regarding the interpreted commands to the third connector.

26. The electronic testing unit of claim 23
wherein the electronic circuitry to receives information regarding electronic signals to be provided at the first connector.

27. The electronic testing unit of claim 23
wherein the electronic circuitry to provides electronic signals at the first connector.

28. The electronic testing unit of claim 23 wherein the first, second, and third connectors are wireless connectors.

29. A computer system for testing electronic accessories, the computer system comprising a computer program on a computer readable media, the computer program comprising:
code for providing a plurality of possible functional capabilities that can be performed by one or more types of electronic accessories;

code for receiving an identification of at least one of the plurality of possible functional capabilities for a particular electronic accessory;

code for using the identified at least one of the plurality of possible functional capabilities to generate a plurality of rules that identify requirements for the particular electronic accessory; and code for generating a plurality of tests for testing the particular electronic accessory based on the plurality of rules.

30. A computer system for testing accessories, the computer system comprising a computer program on a computer readable media, the computer program comprising:

code for providing a plurality of possible functional capabilities;

code for receiving an identification of at least one of the plurality of possible functional capabilities;

code for using the identified at least one of the plurality of possible functional capabilities to generate a plurality of rules, where the plurality of rules comprises a plurality of requirements for the accessory; and code for using the plurality of rules to generate a plurality of tests for testing the accessory;

code for selecting a first test from the plurality of tests;

code for providing configuration information to an electronic testing unit for the first test; and code for providing a prompt for an action to be performed on the accessory for the first test.

31. The computer system of claim 30 wherein the computer program further comprises:

code for receiving first information regarding one or more packets transmitted by the accessory.

32. The computer system of claim 31 wherein the computer program further comprises:

code for storing second information regarding the one or more packets transmitted by the accessory; and code for displaying the second information regarding the one or more packets transmitted by the accessory.

33. The computer system of claim 30 wherein the computer program further comprises:

code for receiving second information regarding one or more packets transmitted by a media player.

34. The computer system of claim 30 wherein the computer program further comprises:

code for generating one or more packets to be provided to the accessory.

35. The computer system of claim 29 wherein the computer program further comprises:

code for displaying the plurality of possible functional capabilities to a user.

36. The computer system of claim 29 wherein the computer program further comprises:

code for displaying to a user an identified at least one of the plurality of possible functional capabilities.

37. The computer system of claim 29 wherein the computer program further comprises:

code for graphically displaying to a user whether the accessory meets all tests for the identified functional capabilities.

38. The method of claim 1 wherein the requirements identify functionality provided by the particular electronic accessory.

39. The electronic testing unit of claim 23 wherein the information comprises testing information.

40. The computer system of claim 29 wherein the requirements identify functionality provided by the particular electronic accessory.

* * * * *

UNITED STATES PATENT AND TRADEMARK OFFICE
CERTIFICATE OF CORRECTION

PATENT NO. : 8,407,671 B2  Page 1 of 1
APPLICATION NO. : 12/238755
DATED : March 26, 2013
INVENTOR(S) : John Ananny and Jesse Dorogusker It is certified that error appears in the above-identified patent and that said Letters Patent is hereby corrected as shown below:

In the Claims

Please correct Claims 24 and 26-27 as shown:

Column 12
Lines 46-49 should read,
24. The electronic testing unit of claim 23 wherein the electronic circuitry [[to]] interprets at least some of the electronic signals received at the first connector as commands.

Lines 53-56 should read,
26. The electronic testing unit of claim 23 wherein the electronic circuitry [[to]] receives information regarding electronic signals to be provided at the first connector.

Lines 57-59 should read,
27. The electronic testing unit of claim 23 wherein the electronic circuitry [[to]] provides electronic signals at the first connector.

Signed and Sealed this
Thirty-first Day of December, 2013

Margaret A. Focarino
*Commissioner for Patents of the United States Patent and Trademark Office*